United States Patent
Sharma et al.

(10) Patent No.: US 10,924,330 B2
(45) Date of Patent: Feb. 16, 2021

(54) INTELLIGENT ANOMALY DETECTION AND ROOT CAUSE ANALYSIS IN MOBILE NETWORKS

(71) Applicant: VMware, Inc., Palo Alto, CA (US)

(72) Inventors: Manu Sharma, Palo Alto, CA (US); Deepak Khurana, Palo Alto, CA (US); Sarabjot Singh, Palo Alto, CA (US); Adnan Raja, Palo Alto, CA (US); Srikanth Hariharan, Sunnyvale, CA (US); Aditya Gudipati, Los Angeles, CA (US); Manu Bansal, Palo Alto, CA (US); Duyen Riggs, Palo Alto, CA (US); Rakesh Misra, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/563,830

(22) Filed: Sep. 7, 2019

(65) Prior Publication Data

US 2020/0084087 A1 Mar. 12, 2020

Related U.S. Application Data

(60) Provisional application No. 62/728,345, filed on Sep. 7, 2018, provisional application No. 62/834,773, filed on Apr. 16, 2019.

(51) Int. Cl.
*H04W 24/04* (2009.01)
*H04L 12/24* (2006.01)
*H04W 24/10* (2009.01)
*H04L 12/26* (2006.01)
*H04W 24/08* (2009.01)

(52) U.S. Cl.
CPC .......... *H04L 41/0631* (2013.01); *H04L 41/16* (2013.01); *H04L 43/0817* (2013.01); *H04W 24/04* (2013.01); *H04W 24/08* (2013.01); *H04W 24/10* (2013.01)

(58) Field of Classification Search
CPC . H04L 43/16; H04L 41/0631; H04L 41/0816; H04L 41/16; H04L 43/0817; H04W 24/04; H04W 24/02; H04W 24/10; H04W 24/08
See application file for complete search history.

(56) References Cited

U.S. PATENT DOCUMENTS

| | | | | |
|---|---|---|---|---|
| 2010/0077077 | A1* | 3/2010 | Devitt | H04L 41/22 709/224 |
| 2015/0149627 | A1* | 5/2015 | Zhao | H04W 36/0061 709/224 |
| 2016/0241429 | A1* | 8/2016 | Froehlich | H04L 41/0631 |
| 2019/0165988 | A1* | 5/2019 | Wang | H04L 41/065 |
| 2019/0196894 | A1* | 6/2019 | Cherbakov | G06F 11/079 |
| 2020/0128441 | A1* | 4/2020 | Singh | H04W 24/10 |

\* cited by examiner

*Primary Examiner* — Dai Phuong
(74) *Attorney, Agent, or Firm* — Clayton, McKay & Bailey, PC

(57) ABSTRACT

A method for automated root cause analysis in mobile radio access networks, including: determining mobile radio access network data (e.g., RAN data); detecting an anomaly for a set of user sessions and/or cells from the RAN data; and classifying the detected anomalies using a set of root cause classifiers.

19 Claims, 10 Drawing Sheets

INTELLIGENT ANOMALY DETECTION AND ROOT CAUSE ANALYSIS IN MOBILE NETWORKS

CROSS-REFERENCE TO RELATED APPLICATIONS

This application claims the benefit of U.S. Provisional Application No. 62/728,345 filed 7 Sep. 2018, and U.S. Provisional Application No. 62/834,773 filed 16 Apr. 2019, each of which is incorporated in its entirety by this reference.

TECHNICAL FIELD

One or more of the inventions described herein generally relate to the mobile networking field, and more specifically to a new and useful system and method for providing intelligent anomaly detection and root cause analysis in the mobile networking field.

BACKGROUND

Monitoring and control of mobile networks, such as Mobile Radio Access Networks (RANs) presents a significant technical challenge. In many cases, such mobile networks include tens of thousands of cells, and are used by millions of user devices. An operator of a mobile network must monitor this system in real time in order to identify anomalous device and network behavior within this large network, meaning a deviation from normal usage of the mobile network. This includes locating places where the anomalies are happening. Once detected, a root cause analysis (RCA) typically follows, including a deeper exploration into the root cause(s) of those anomalies, which helps the operator to possibly fix the underlying problem. One example of an anomaly is signal interference which causes an abnormally high packet drop rate, resulting in many dropped calls within an area of the mobile network. A root cause analysis can identify a root cause of an illegal repeater in a specific location of the mobile network.

A typical method for automating this detection and root cause analysis involves monitoring certain Key Performance Indicators (KPIs), or metrics affecting the quality of experience (QoE) and service of users within the network, and raising a flag or alarm when a predefined fixed threshold is exceeded for a KPI. Typically, domain experts set thresholds for anomaly detection and follow procedures of RCA playbooks. While this method can detect and analyze certain anomalous behaviors, it is incapable of detecting a wide range of anomalous behaviors, for several reasons. First, such thresholds will often be different for different cells or parts of the network. Second, mobile network and user demographics are continuously changing; these thresholds become erroneous whenever traffic density or usage patterns change. Third, there are a significant number of possible KPIs for monitoring QoE and mobile network performance, on the order of hundreds of thousands, and manually picking meaningful alert thresholds for each KPI is infeasible, or at best burdensome and prone to errors. Fourth, contextual anomalies are not typically detected by this method. For example, for two metrics X and Y, there may be an anomaly of X being larger than x(0) only when Y is greater than Y(1). Such relationships between metrics, and nested conditions, are not caught by a relatively simple threshold-based method. Overall, this method ends up being slow and human capital-intensive while leaving a scope of error due to manual intervention.

Thus, there is a need in the mobile networking field to create new and useful methods for providing intelligent anomaly detection and root cause analysis of mobile network interference that is capable of detecting and analyzing a wide range of anomalies in a variety of contexts. The inventions described herein provide such new and useful methods.

DESCRIPTION OF THE PREFERRED EMBODIMENTS

Figure 1:
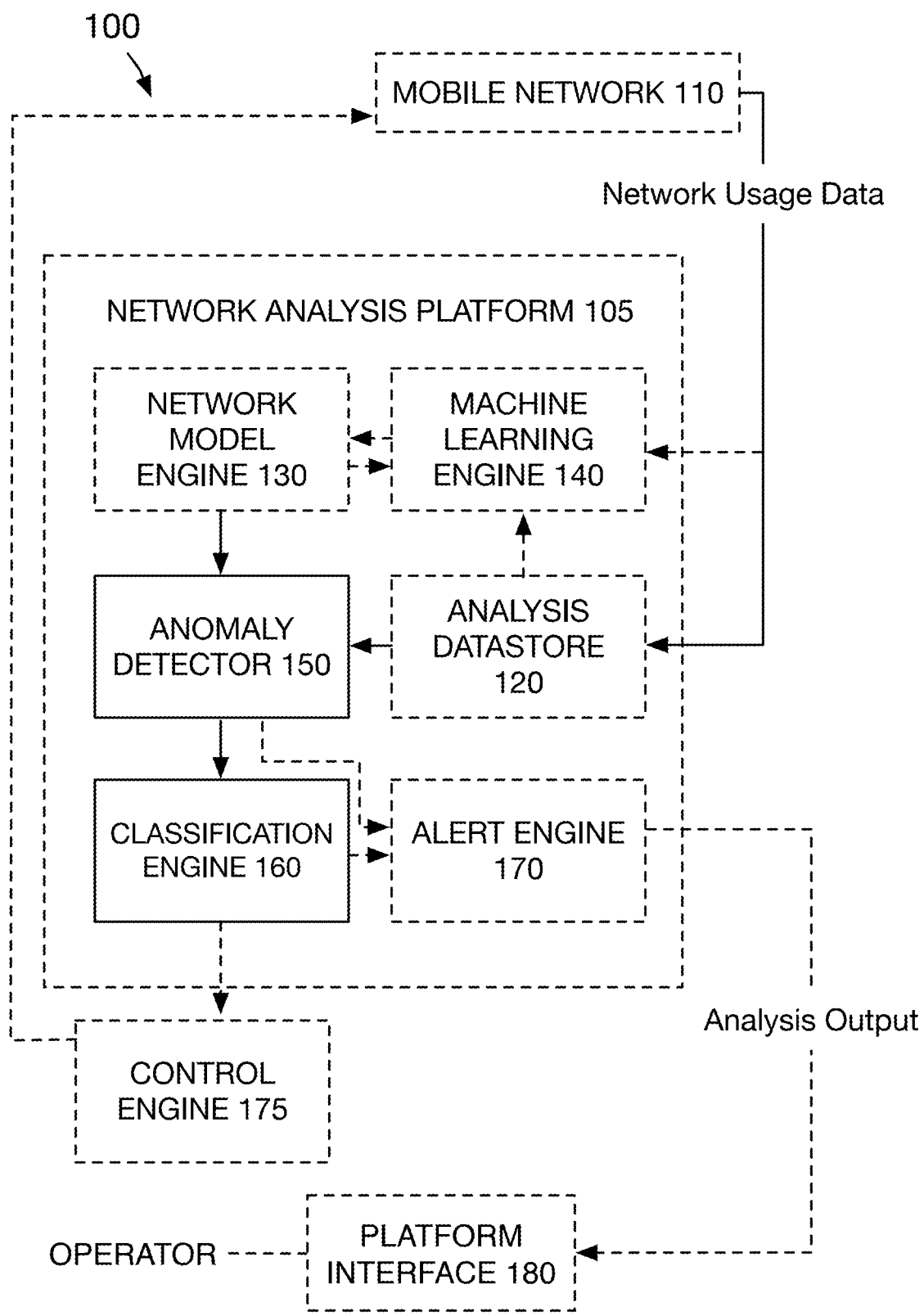
FIG. 1 illustrates a schematic representation of a system in accordance with one or more embodiments of the present application.

The following description of the preferred embodiments of the invention is not intended to limit the invention to these preferred embodiments, but rather to enable any person skilled in the art to make and use this invention.

1. Overview

As discussed above, a significant need for providing intelligent detection and analysis of anomalies is becoming apparent in the mobile networking field. The current solutions do not adequately address the need for automated, intelligent anomaly detection and root cause analysis within mobile networks.

The systems and methods herein address this need by providing an anomaly detection and root cause analysis system that utilizes machine learning methods to automatically, intelligently detect anomalous behaviors in a mobile network, identify the most probable root cause(s) for the issue, provide alerts to a provider based on detection and analysis of the anomaly, and optionally, suggest or actuate control action(s) to improve performance and/or mitigate the issue.

At a high level, the systems and methods herein function to provide an automated system for detecting anomalous behavior in and/or across user sessions and network elements such as cells (e.g., geographic regions associated with a set of transceivers or cell sites) or sectors in a wireless network (e.g., a mobile radio access network, or RAN). Feature extraction, anomaly detection, root cause classification, alert generation, and optionally, control or recommendation functionality are provided to this end.

In many mobile networks, the result is, among other effects, a lower missed detection and false alarm rate for anomaly detection in mobile networks as compared to using manually calculated, fixed thresholds. This leads to increased network efficiency and enhanced application experience for users on the network.

2. Benefits

The method for providing intelligent anomaly detection and root cause analysis (and/or system) can confer several benefits over conventional methods. First, embodiments of the method can determine the severity of a root cause, which may include the real number of user sessions impacted by a root cause and/or the proportion of user sessions (for a particular cell, geographic region, etc.) impacted by root cause. This can improve network provider response by facilitating prioritization of root causes that have a larger impact and/or affect more individuals, meaning providers will be better able to improve overall quality of service (QoS) and network reliability. Second, embodiments improve the detection of anomalies that are not visible at the cell level. Addressing these anomalies/issues can improve the user experience, QoS, and network reliability. Third, embodiments operate in real time (or near real time), which allows early identification of root causes. This means root causes can be addressed before they become more serious and/or impact more user sessions. However, the method for providing intelligent anomaly detection and root cause analysis can confer any other suitable set of benefits.

3. System for Providing Intelligent Detection and Analysis of Anomalies in a Mobile Network As shown in FIG. 1, a system 100 for providing intelligent detection and analysis of anomalies in a mobile network includes a network analysis platform 105, a mobile network 110, an analysis datastore 120, a network model engine 130, a machine learning engine 140, an anomaly detector 150, a classification engine 160, an alert engine 170, and a platform interface 180. The system functions to detect anomalies, and can optionally: determine the root cause(s) of the anomaly (e.g., classify the anomaly with one or more root causes), resolve the anomaly, or perform any other suitable functionality.

The network analysis platform 105 may be implemented by a mobile networking service, network monitoring and/or control service, network security service, internet service provider, or any other network service. In a preferred embodiment, one or more aspects of the system may be enabled by a web-based software platform operable on a web server or distributed computing system. The network analysis platform preferably performs all or part of the method, but can additionally or alternatively perform any other suitable functionality. In one example, the network analysis platform receives radio access network data generated by a set of base stations, determines a plurality of user sessions from the radio access network data, detects anomalous user sessions from the plurality of user sessions, detects anomalous cells based on the radio access network data, determines a root cause for each of the anomalies, determines number of anomalous user sessions associated with the root cause, and generates an alert for the root cause (e.g., based on the number of anomalous user sessions associated with the respective root cause).

The system 100, of a preferred embodiment, functions to receive network usage data of a mobile network (e.g., network conditions) at a network analysis platform, then optionally generate a network model based on that data. Machine learning models are optionally trained with the network model, and are used to detect an anomaly within an area of the mobile network. The anomaly is classified with a root cause or causes. Alerts are then generated for the anomaly and provided to the operator of the mobile network.

The mobile network 110 can be a mobile network, cellular network, wireless network, wireless spectrum network, or any other network maintained by a network operator. The network can include a set of base stations and/or a set of cell sites connected to the public switched telephone network (PSTN), but can additionally or alternatively be any other suitable network. In some embodiments, the network operator is a streaming media provider, internet service provider, vendor, or other entity associated with a network. In some embodiments, the mobile network sends network usage data (e.g., radio access network data or RAN data; cellular data; etc.) to the network analysis platform. Network usage data (e.g., network conditions, RAN data) can include, but is not limited to, downlink throughput, uplink throughput, rate of dropped calls, packet drop rates, user device data, data bandwidth usage, metrics such as Key Performance Indicator (KPI) metrics, geographic region of the mobile network, historical data on anomalies including timestamps, root causes classified for past anomalies, and/or any other suitable data. The network usage data can be: a stream of real-time or near-real time data, delayed data (e.g., delayed by a minimum amount of time), batched, or have any other suitable temporal characteristic. In some embodiments, the network analysis platform monitors the mobile network and collects network usage data. Alternatively, the network analysis platform can periodically request network usage data from the mobile network. However, the network usage data can be otherwise determined. In some embodiments, the network usage data is stored within an analysis datastore 120 within the network analysis platform.

The analysis datastore 120 of a preferred embodiment may include one or more databases in which network usage data collected from operators of mobile networks and/or other various entities may be stored. In one implementation, the analysis datastore 120 may include a mobile network databank for storing mobile network usage data during an analysis of an anomaly within the network.

The network model engine 130 operates to receive network usage data of the mobile network 110 at the network analysis platform 105. In some embodiments, the network usage data can be received from the mobile network 110, from an operator of the mobile network 110 via one or more devices, from the analysis datastore 120, or from any other suitable source. In some embodiments, the network usage data is collected from the mobile network 110 by the network model engine 130. In some embodiments, the network model engine 130 is given access to monitor the mobile network 110 and collect data, including network usage data.

The network model engine 130 further operates to generate a network model based on the network usage data. In variants, the network model engine functions to determine baseline (or normal) operation for a given base station, cell, user session, and/or operation context. In some embodiments, the network model includes a number of network usage features (and/or values) identified as normal usage of the network. In some embodiments, the network usage features can be a set of features along with dimensions in which the behavior of the features are quantitatively measured. In some embodiments, a feature extractor optionally extracts the set of features and outputs a subset of the features or the full set of the features to the anomaly detector 150. In some embodiments, the features are quantitatively measured. In some embodiments, the network model engine includes a set of features that defines user experience, session behavior, and/or characteristics and that of network elements like cell, sector, and/or other network elements.

In some embodiments, the network model engine functions to establish a set of "normal" behaviors and/or network usage traits (baseline) of the mobile network, a cell, a base station, a user session, a session with the user session's operating parameters or context, and/or other suitable analysis unit. The network model engine can be generic, specific to a base station or cell, specific to a user session, specific to a context, and/or otherwise related to multiple analysis units. The network model engine can be a neural network, a baseline database (e.g., for each cell; user session; operating context such as geolocation, sector etc.; etc.), and/or have any other suitable architecture. The baseline can be: manually determined, learned (e.g., using a neural network), classified (e.g., wherein the anomaly detector 150 can classify the analysis unit behavior as normal or abnormal), calculated, or otherwise determined. The baseline can be: a threshold feature value or set thereof (e.g., set of normal KPIs), a predetermined feature value range or set thereof, a predetermined pattern, an expected feature value or set thereof, and/or any other suitable baseline or reference. The baseline can be determined based on historical data (e.g., cell operation parameters, RAN data, cell population data, etc.), real- or near-real time data (e.g., wherein the baseline is constantly being updated, such as using online training), real- or near-real time data without anomalies, and/or any other suitable data. The baseline can be predetermined, dynamically determined, and/or otherwise determined. In some embodiments, "normal" behavior is majority behavior, while non-"normal" behavior is outlier behavior or deviations from normal behavior. In some embodiments, the network model engine establishes "normal" behavior by receiving information or real-time data from administrators, operators, and/or users of the mobile network that quantifies examples of normal behavior. In some embodiments, machine learning methods are utilized, such that the network model engine 130 employs one or more neural networks which ingest the network usage data. The neural networks are trained using the input network usage data to generate a model or profile of the mobile network's normal or majority behavioral traits. In some embodiments, the input network usage data can include historical data, new data, and/or one or more standard sets of data. In one example, the network model engine quantifies the deviation of the metrics associated with the user session or network element from their expected joint and marginal distributions. In another example, the network model engine continuously or periodically updates the input network usage data to include new pieces of data that have been generated and output from the network model engine, such that the system is continuously evolving. In some embodiments, this updating is performed automatically and without any human input.

The system can optionally include a machine learning engine 140, which functions to apply machine learning techniques for training one or more machine learning models. In some embodiments, the machine learning engine 140 can leverage one or a combination of machine learning techniques, statistical techniques, heuristics, rules, human-in-the-loop feedback and labeling, and/or other methods to train the machine learning models. In some embodiments, the machine learning models are specialized for specific purposes of network analysis (e.g., network model engines, anomaly detection models, root cause classifiers, etc.). In a first variation, the system includes one or more network model engines (e.g., generic baseline determination models, specific network model engines 130, etc.) that determine the baseline performance for one or more base stations or cells and/or user sessions. In a second variation, the system includes one or more anomaly detection models (anomaly detection engines 150) that detect and/or classify an anomaly in the base station data, cell data, and/or user session data. In a third variation, the system includes one or more root cause classifiers (e.g., a single classifier that classifies multiple root causes; multiple classifiers, each specific to a root cause, etc.; e.g., classification engine 160). However, the system can include any other suitable set of models, trained for any other suitable analysis.

In variants, the machine learning engine 140 leverages the mobile network model in training the machine learning models. In some embodiments, the machine learning engine 140 trains the machine learning models by feeding training set data into the models. The training set data can include: the received and/or collected network usage data (e.g., historic, subsequent data collected after new configuration deployment), profile information or customized preferences for the mobile operator (such as through an account the operator has within the network analysis platform), operator-labeled training data, historical data used for past training of models, heuristics, rules, statistical techniques, and any other data that would be useful in training the machine learning models for anomaly detection and/or analysis purposes. In preferred embodiments, the network model, machine learning models, network usage data, heuristics, rules, thresholds, and/or other data or models used as training set data are all different per mobile network and/or per operator of a mobile network, as a result of the mobile network's unique usage data, behavioral traits, and generated network model.

In some embodiments, the training set data ingested by the models includes labeled datasets of "normal" behavior of the mobile network, which are received or generated by one or more components of the network analysis platform 105. In some embodiments, the labeled datasets of bad emails include human-labeled "normal" behavioral traits and/or usage data. Through human labeling from, e.g., mobile network operators and/or administrators, employees, security service representatives, and/or network analysis representatives, a set of human-labeled training set data can be used to train the machine learning models based on that mobile network.

In some embodiments, one or more pieces of training set data from a subset or full set of the training set data is scored, weighted, or assigned a percentage or numerical value based on using these machine learning models. In some embodiments, if a piece of training set data scores over the threshold for any of the models, it can be flagged, unless a heuristic or other element of the network analysis platform 105 indicates that it should not be flagged.

The anomaly detector 150 operates as a part of the network analysis platform to detect, with the one or more trained machine learning models, a cell anomaly (e.g., anomalous cell) and/or a user session anomaly (e.g., anomalous user session) within the network usage data (e.g., based on features extracted from the mobile network usage data. The anomaly detector 150 can include: a single anomaly detector (e.g., for user session anomaly detection and/or cell anomaly detection); one or more anomalous user session detectors; one or more anomalous cell detector; and/or any suitable number of or type of detector. The anomaly detector can optionally be (or include) the network model engine, or be separate and distinct from the network model engine.

The anomaly detector can determine deviations (e.g., anomaly probability which exceeds a threshold) from the baseline (e.g., determined by the network model engine), determine a binary determination of a deviation or deviant behavior (yes/no), deviation class, etc.) based on user session KPIs, and/or determine any other suitable anomaly condition. The anomaly detector can be a neural network (e.g., that detects deviations away from a baseline), a classifier (e.g., that classifies the anomaly type), a comparator (e.g., comparing the current user session data, cell data, other data, and/or features thereof with the respective baseline), and/or any other suitable data construct.

In variants, the anomaly detector can include or interface with a user session compiler that determines a user session. The user session compiler preferably aggregates the network usage data from one or more network usage data streams (e.g., RAN data streams) into a user session for a given user device or user, but can additionally or alternatively count the number of unique user identifiers that appear in the network usage data for a given cell or base station (e.g., for a predetermined period of time), or otherwise determine the user session. The user session compiler can: determine a set of user identifiers (e.g., user device identifiers, such as IMEIs or IP addresses; user accounts identifiers; phone numbers; etc.); for each of the set of user identifiers, extract the network usage data segments associated with the respective user identifier from the network usage data streams (e.g., from the base stations); and, for each of the set of user identifiers, aggregate the network usage data segments into a user session for the respective user identifier. User sessions are preferably continuous (e.g., temporally, wherein network usage data associated with the user identifier is generated above a predetermined frequency) and span multiple base stations or cells; however, the user sessions can be discontinuous (e.g., include usage gaps), be specific to a given base station, cell, or sector, or otherwise defined. However, the user sessions can be otherwise determined from the network usage data.

In a preferred embodiment, anomaly detection is automated without human input involved. In some embodiments, the anomaly detector 150 monitors the mobile network and collects current usage data according to one or more metrics. In some embodiments, the mobile network authenticates an operating session representing an operator or administrator of a mobile network granting the network analysis platform 105 access to monitor the mobile network, collect data from the mobile network, and/or receive data sent from the mobile network. In some embodiments, the metrics can be in whole or in part user-specified. In some embodiments, the metrics are KPIs which are either used as default metrics or specified by the user or operator of the mobile network.

Examples of anomalies within a mobile network may include, but are not limited to: an abnormally high packet drop rate; abnormal fall back of voice calls from, e.g., Long-Term Evolution (LTE) to 3G/2G on certain software version of a specific mobile device; and abnormally low downlink and/or uplink throughput. Many other anomalies can be detected for a mobile network.

In a preferred embodiment, an anomaly can be detected as any deviation from the "normal" behavior or majority behavior as determined via the generated mobile network model and the (recently-received) network usage data. In some embodiments, deviations on this normal behavior are quantified using statistical methods to model the anomaly or anomalous behavior. In some embodiments, the statistical methods may include analyzing conditional probability and measuring the deviation of that conditional probability between a conditional solution of observed behavior (e.g., monitored network usage) and what is considered normal (e.g., normal or majority behavior as determined from the mobile network model.) In some embodiments, the statistical methods include looking at one or more probability distributions in an n-dimensional space of the mobile network model. In some embodiments, the anomaly detector 150 utilizes an expected model of distributions related to one or more root causes.

In some embodiments, the detection is performed via one or more feed forward neural networks employing the machine learning model(s). The neural networks ingest the normal or majority behavior via the mobile network models, and are trained to learn the majority behavior. Anomalies or rare occurrences within the mobile network are then detected by the neural networks when statistical deviations from the majority behavior are detected by the feed forward neural networks. In some embodiments, deep neural networks are utilized which leverage deep learning techniques. In some embodiments, the inputs for the neural networks are mobile network model data and/or other metrics, and the outputs are probabilities representing the certainty of an anomaly being detected within an area of the mobile network. In some embodiments, the anomaly detector 150 further outputs one or more metrics relating to the anomaly, which in some embodiments can be related to a set of KPIs for a mobile network. In some embodiments, the metrics for the anomaly can include, e.g., time, frequency, and/or spatial characteristics of the anomaly, such as mobile network interference within an area.

In some embodiments, the area of the mobile network can be a subset of the geographic area the mobile network encompasses, or the whole area of the mobile network. In some embodiments, the anomaly detector 150 receives geographical data from the mobile network. In some embodiments, the anomaly detector 150 determines a geographical area based on one or more mobile devices sending Global Positioning System (GPS) data.

In some embodiments, the anomaly detector 150 flags all user sessions where the session KPIs (key performance indicators), are much different than expected (e.g., deviates more than a predetermined threshold and/or beyond a predetermined range). Examples of session KPIs include: quality of service, quality of experience, VoLTE, success statistics (e.g., percentage of completed view, failed access, lost video), waiting time, picture quality, video fluency, and/or any other suitable metric. This deviation is measured through statistical techniques in both an absolute and conditional sense, where the latter involves conditioning on a set of session features and evaluating anomalies in another set of features. Such absolute and relative expected behavior of user sessions under potentially many (e.g., hundreds or thousands) different network and device combinations can be periodically and/or continuously updated automatically using the network usage data. In some embodiments, deviations from normal behavior are quantified using statistical methods or statistical metrics, such as an anomaly score.

The classification engine 160 operates to classify, with the one or more machine learning models, the anomaly by root cause (e.g., when the anomaly detector 150 detects an anomaly). Additionally or alternatively, the classification engine 160 determines the root cause(s) for an anomalous user session and/or cell. In some embodiments, the classification engine 160 classifies the anomaly based on a pre-specified or predefined list of root causes. In some embodiments, the system can include a single classification engine, a set of classification engines (e.g., a set of 4 root cause classification engines), and/or any suitable number of classification engines. The classification engines for user sessions anomalies (e.g., anomalous user sessions) can be the same as or different as those for cell anomalies The classification can be configured to detect a specific type of root cause, specific to a different root cause, applicable to multiple root causes, and/or otherwise related to one or more root causes. In one example, a classification engine outputs a probability for each of a predetermined set of root causes, wherein the root cause(s) for the anomaly can be the root cause(s) with the highest probability. In a second example, a plurality of classification engines, each associated with a different root cause, each output a probability for the respective root cause, wherein the root cause(s) for the anomaly can be the root cause(s) with the highest probability. However, the root cause(s) for the anomaly can be manually determined (e.g., when the output probabilities are below a threshold value, when the probabilities are within a predetermined distance of each other, etc.), or otherwise determined.

The classification engine 160 can analyze multiple anomalous user sessions and/or anomalous cells: in series, as a batch, in parallel, and/or in any suitable order or combination. The classification engine can classify the anomaly with the root cause based on: the network usage data underlying the anomaly (e.g., anomalous user session, anomalous cell, etc.); the divergent condition(s); features extracted from said network usage data (e.g., KPIs; anomalous KPI identifiers and/or values; non-anomalous KPIs; all KPIs; network KPIs; content KPIs; etc.); the network configurations associated with said network usage data; and/or any other suitable data. In a specific example, the classification engine 160 classifies the anomaly based on the divergent network condition and associated network KPIs.

In some embodiments, the detected anomalous behavior, associated data or metrics for the anomaly (e.g., features from before the anomalous event, features from when the anomalous event was occurring, and/or features from after the anomalous event), and/or user session data relating to the anomaly are fed into one or more machine learning models related to analysis of the model, such as root cause analysis (RCA). In one example, the classification engine 160 receives as input all user sessions flagged by the anomaly detector 150 where the session KPIs are much different than expected, and then the classification engine is trained on that set of data. In some embodiments, root-cause specific KPIs are fed into the one or more machine learning models. In some embodiments, the RCA-based machine learning models are trained by the machine learning engine 140 to identify an impact or impacts caused by a particular network or device property which can be the root cause(s) of an anomaly. In these embodiments, the anomaly can be classified with the root cause associated with the model outputting the largest impact, the set of root causes having an impact over a threshold impact, or be otherwise classified based on the impact per root cause. In some embodiments, anomaly classification can be based on comparison of measured user session performance, such as downlink throughput, with the expected user session performance. In some embodiments, the impact of the root cause is quantified as the difference between the measured performance metric and the predicted nominal performance metric. In some embodiments, the predicted nominal performance metric is calculated with root cause-specific session metrics, such as KPIs. In some embodiments, the expected marginal distributions related to that root cause are derived from the conditional normal behavior of the session metrics. In some embodiments, the output of the RCA models is a probability of each root cause for the anomaly, where the probability is the likelihood that the root cause identified is the actual root cause for the anomaly.

In some embodiments, the classification engine 160 analyzes time, frequency, and/or spatial characteristics of the anomaly to identify what the root cause is. In some embodiments, system 100 calculates a measurement for a particular time and frequency across a given space for the anomaly. In some embodiments, the classification engine 160 correlates and/or aggregates the results of these measurements and identifies common patterns in them, and then uses the common patterns to determine a root cause. In some embodiments, multiple anomaly metrics within the network are used for determining a root cause. In some embodiments, aggregation of anomaly metrics to identify patterns results in an increase in classification accuracy and performance. In some embodiments, the classification engine 160 combines data across cells. In some embodiments, based on the correlated metrics, if the same anomalous behavior is affecting multiple infrastructure elements or cells, then the classification engine 160 determines that something is happening (e.g., an external jammer), and is not localized but rather is widespread.

In some embodiments, the classification engine 160 operates to enable a polling mechanism for improved detection, collection, and/or classification accuracy. In some embodiments, upon detecting an anomaly in a certain geographical area, a user device or group of user devices in the area may be "polled" by the network to report further measurements related to their experienced interference levels, e.g., Radio Signal Reference Quality (RSRQ) as well as their location information. In addition to using telemetry data from cell towers and other infrastructure elements within the mobile network, system 100 prompts, requests, or commands one of more users, operators, or devices within the mobile network and/or network analysis platform 105 to collect data and/or report measurements relating to the mobile network. In some embodiments, this includes "polling" or pinging devices and requesting the devices to report data and responses back to the network analysis platform. The data or responses relate to how users or devices are experiencing anomalous behavior. In various embodiments, this can improve the collected data set upon which data is generated, root cause classification of anomalous behavior is performed, and/or other aspects of anomaly detection and analysis. In some embodiments, the polling mechanism requests one or more devices to report back the anomalous behavior they're experiencing in the mobile network. In some embodiments, this is a firmware-level response from the device and does not involve human input or attention.

Examples of root cause classification for an anomaly may be, but are not limited to: for an abnormally high packet drop rate, the root cause can be an illegal repeater in a specific location causing higher than normal external interference on the uplink; for abnormally low throughput, the root cause can be misconfiguration of control channel capacity parameters resulting in excessive congestion; and for abnormally low throughput on one specific sector carrier, a root cause can be load imbalance. Other root causes may be, e.g., downlink interference, uplink interference, or congestion. In some embodiments, different RCA models are trained to identify and analyze root causes for each of a predefined number of root causes.

The alert engine 170 operates to generate one or more alerts for the anomaly, and then provide the alerts to an operator of the mobile network. In some embodiments, the alert engine 170 receives the output of the anomaly detector 150 (e.g., the probability data of anomalies from one or more machine learning models) and/or the classification engine 160 (e.g., the probability data of root causes for anomalies from one or more machine learning models), and generates alert(s) based on the information. In some embodiments, the information takes the form of a concise, actionable format in atoms called "alerts". Different operator policies are accounted for in impact quantification of each root cause and relative prioritization for generation of alerts and providing alerts to an operator in a certain time, periodic frequency, or other fashion. Alerts can include: an alert identifier, a symptom (e.g., the deviant KPI factors, the KPIs associated with and/or driving root cause classification, etc.), the anomaly duration (e.g., contiguous period during which the anomaly was detected), an anomaly timestamp (e.g., time at which the anomaly was first detected in a user session and/or cell), the session impact (e.g., severity score, severity percentage, etc.), number of affected user sessions, number and/or identifiers for affected cells or base stations, the root cause, one or more recommendations (e.g., user, cell, or policy-specific control guidance), historical trends (e.g., for the cell, base station(s), sectors, user sessions, etc.), the geolocation, the associated network conditions, and/or any other suitable information.

In some embodiments, the alerts may take the form of a graphical user interface (GUI), such as a dashboard which the operator can access and view alerts and information related to one or more anomalies in the mobile network associated with the operator. In some embodiments, the alert engine 170 sends generated alerts as a subset or full set of analysis output to a platform interface 180, which provides a GUI for an operator of the mobile network to access via one or more operator devices.

Figure 3A:
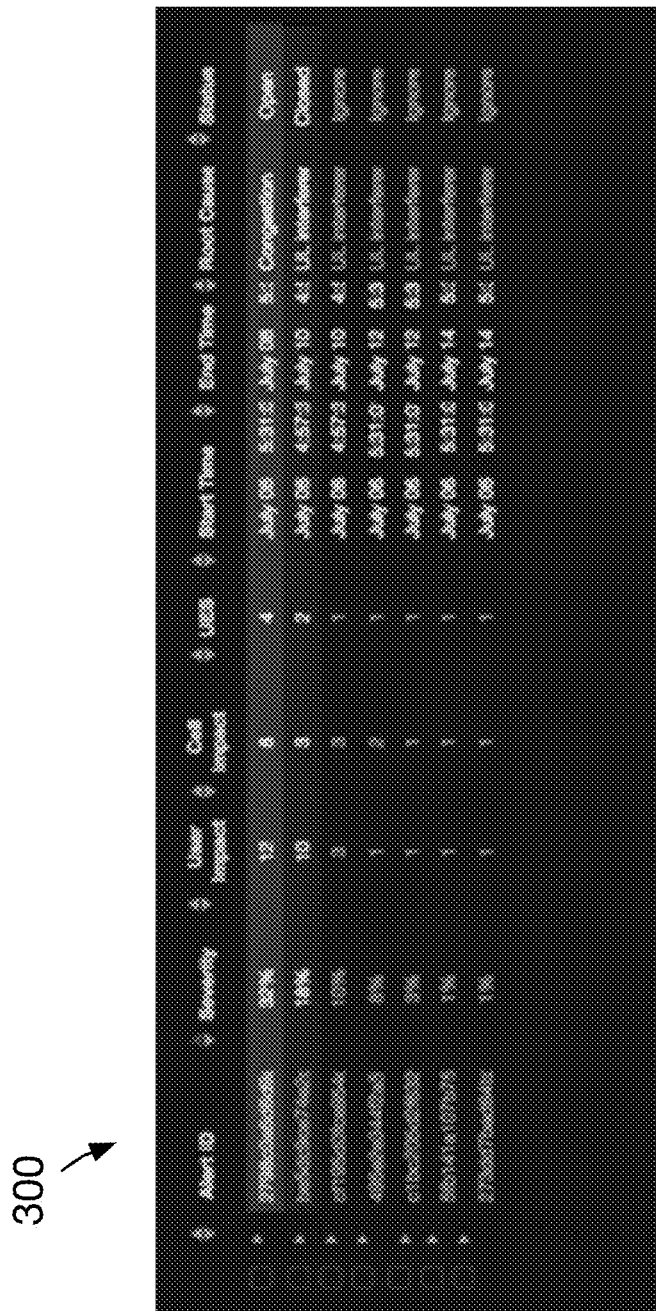
FIGS. 3A, 3B, and 3C are illustrative examples of user interfaces for providing alerts in accordance with one or more embodiments of the present application.
Figure 3B:
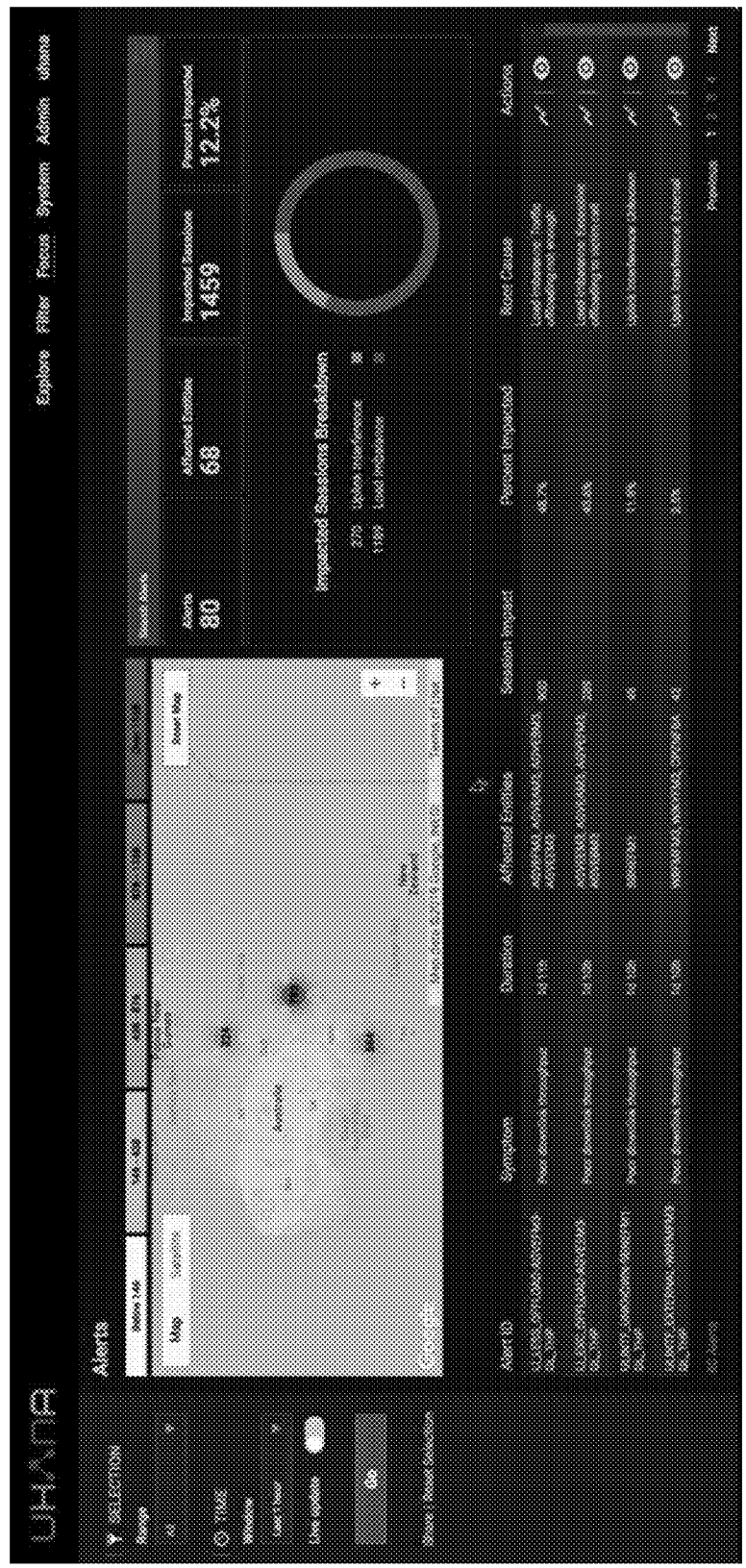
Figure 3C:
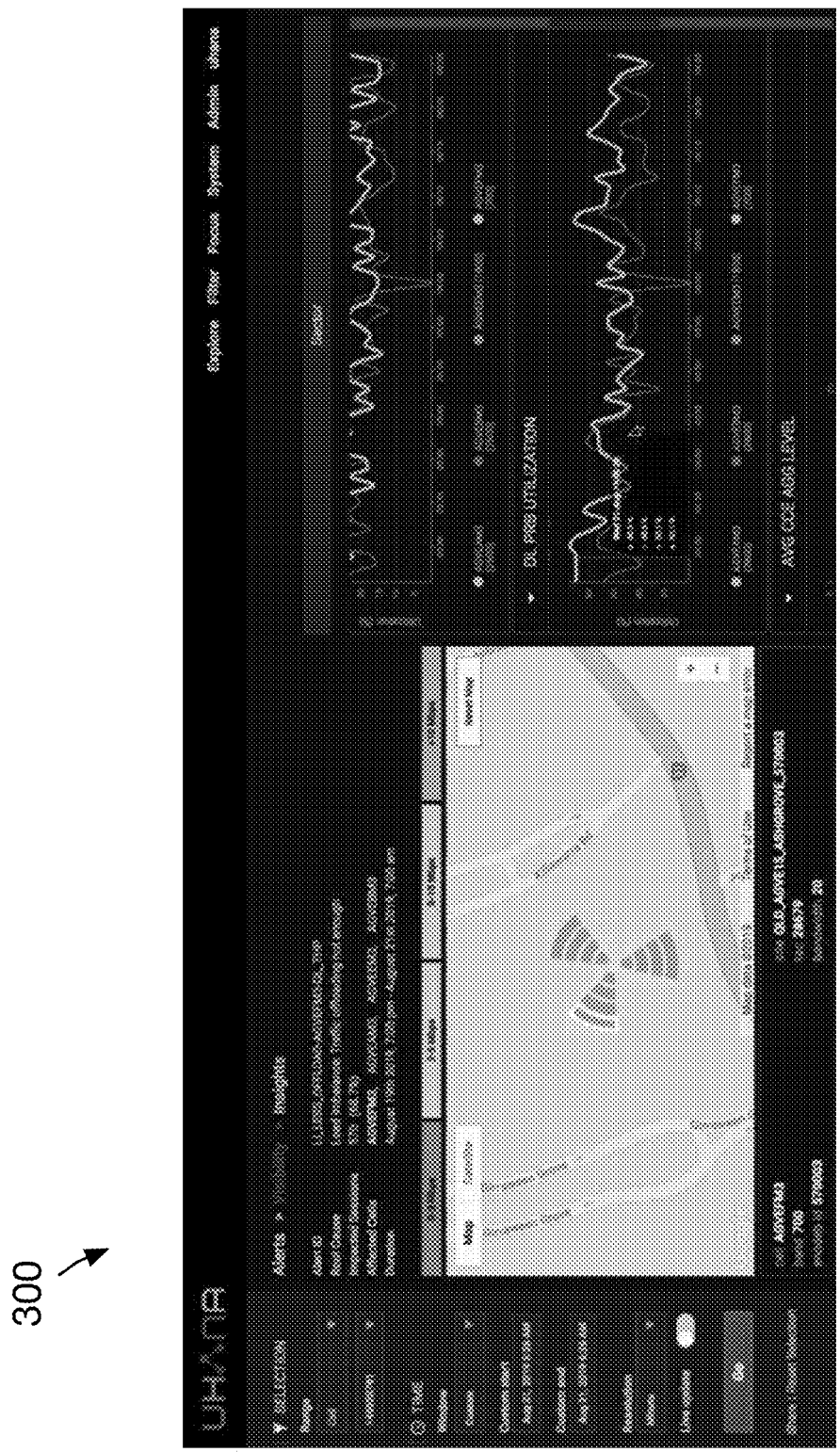

FIGS. 3A, 3B, and 3C illustrate examples of user interfaces for providing alerts in accordance with one or more embodiments of the present application. The illustrated screenshot 300 represents one example of a GUI in the form of a dashboard that is provided to an operator of the mobile network, on a device associated with the operator. A series of generated alerts are provided to the operator, represented as rows in a table. A unique identifier for Alert ID is provided for each alert. A severity percentage represents the impact the particular root cause and anomaly identified has on the mobile network. In one example, the severity percentage relates to the extent to which a user session was impacted within the mobile network, based on network usage data and/or other collected data associated with how many user sessions were impacted, and to what extent.

In a second example, the severity percentage includes a percentage of user sessions impacted by the root cause. In this example, the system can optionally include an aggregator that: aggregates anomalous user sessions by root cause; determines the total number of user sessions sharing common operation parameters (e.g., total number of user sessions supported by the same set of cells and/or base stations, etc.); and determines the severity score based on the number of anomalous user sessions sharing a common root cause and the total number of user sessions (e.g., wherein the severity score is an impact percentage calculated based on the number of anomalous user sessions divided by the total number of user sessions). The aggregated user sessions can be: user sessions associated with an already-detected anomaly and/or root cause; user sessions occurring within a predetermined period of time; and/or any other suitable set of user sessions. This example can optionally include determining the anomalous cells sharing the root cause (e.g., from the independently-determined anomalous cells, from cells shared by the anomalous user sessions) and determining the total number of user sessions based on the anomalous cells. The aggregator can additionally or alternatively determine an amount of time to: cache network usage data and/or derivative features associated with anomalies; wait between anomaly detection and alert generation; determine that an anomaly has ceased; and/or any other suitable time period. The alerts can optionally be ordered in decreasing order of impact, severity, number of impacted users, and/or otherwise ordered.

In some embodiments, alerts can expose other information to an operator of the mobile network, including how many users were impacted, how many cells were impacted, a start time and an end time for the anomaly, and the root cause of the anomaly. In some embodiments, the criteria for severity, user impact, cell impact, and/or other alerts or metrics are specific to a given mobile network that receives the alerts through an operator of the mobile network. In some embodiments, based on multiple different root causes for a single anomaly, the severity percentage can show the impact each of the different root causes has on contributing to the anomaly. In some embodiments, the criteria and/or metrics for severity can be configured and specified by the operator and/or administrator of the mobile network. For example, if an administrator is concerned about the throughput and voice quality of the network, both can be factored into the criteria for the severity percentage.

Returning to FIG. 1, in some embodiments, alert engine 170 exposes the generated alerts to an operator or administrator of the mobile network via an Application Program Interface (API). In some embodiments, the platform interface 180 sends queries to the analysis datastore 120, which stores and maintains stored analysis output information. In some embodiments, the queries for the API or GUI include detected anomaly, identified root cause, severity impact (e.g., severity score), and other filters in which results are desired. In some embodiments, the response to these queries would include the list of all the alerts for anomalies detected in the network or another specified filter, along with metrics or attributes for those anomalies.

In some embodiments, alert engine 170 can expose an API in a similar fashion for anomaly detection and analysis which may expose the outputs of anomaly detector 150, recommendation engine, and/or classification engine 160. In some embodiments, an operator, administrator, or developer associated with the mobile network can query a database, such as the analysis datastore 120, for probabilities of anomaly or root cause classification, metrics and attributes of anomalies, and other data.

Figure 4:
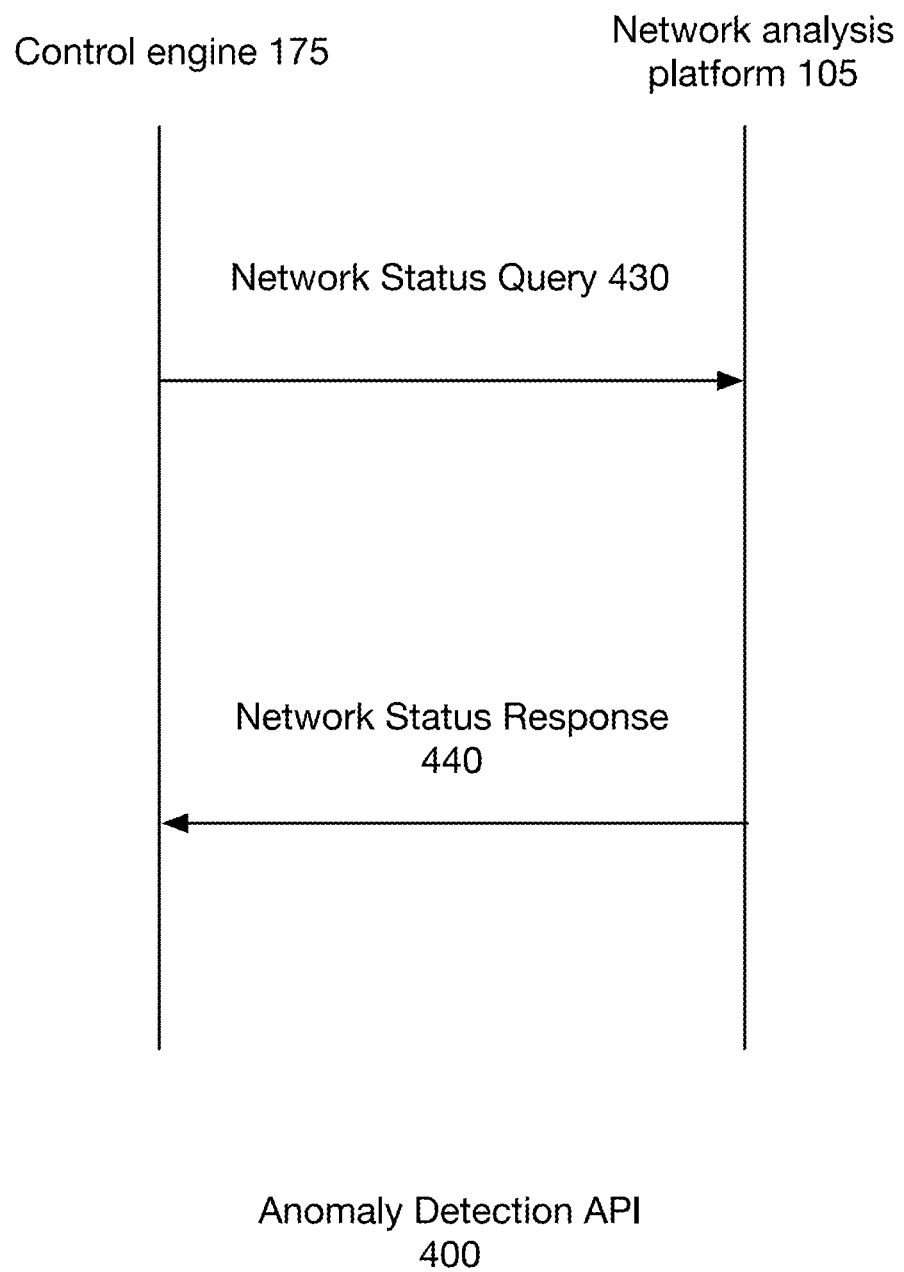
FIG. 4 illustrates a schematic representation of an anomaly detection API in accordance with one or more embodiments of the present application.

FIG. 4 illustrates a schematic representation of an anomaly detection API 400 in accordance with one or more embodiments of the present application. The anomaly detection API 400 depicts the generic call flow between a network controller, or control engine 175 and the anomaly detector 150. In some embodiments, control engine 175 optionally operates to receive output from the RCA modules of classification engine 160 and, based on this output, to modify one or more control parameters in the mobile network automatically. In some embodiments, the control engine 175 optionally provides one or more recommended actions for manual configuration by an operator or administrator of the mobile network. In some embodiments, the control engine 175 uses machine learning techniques, and utilizes Reinforcement Learning techniques to learn from past control actions. In some embodiments, the control engine 175 also outputs a prediction of improvement in KPIs possible with the recommended actions. In some embodiments, the control action(s) or recommended actions are based on a policy configuration set up as a default by the network analysis platform or preconfigured by an operator or administrator of the mobile network.

The network status query 430 can take different forms in differing embodiments and contexts. In some embodiments, the network status query 430 is a query to list all alerts caused by a service policy violation, e.g., poor throughput for Guaranteed Bit Rate (GBR) traffic. In some embodiments, the query 430 is a query to list all sessions with an anomaly score greater than a prespecified threshold. In some embodiments, the query 430 is a query to list all sessions impacted by a specific root cause.

The network status response 440 includes the requested information from the network status query 430. In some embodiments, the impacted sessions (e.g., anomalous sessions) can be aggregated by root cause and cell and/or location, and optionally ordered in decreasing order of impact or severity. In some embodiments, the response 440 can also include one or more recommendations for control actions to resolve an alert. For example, localization of an illegal interferer, configuration changes for resolving a handover issue, and other recommendations can be exposed through the anomaly detection API.

The recommendation may be generated by a recommendation engine (as part of the network analysis platform 105), which determines a fix/recommendation for a root cause. The system can include one or more recommendation engines (e.g., one for all root causes, a different recommendation engine for each root cause, etc.). The recommendation engine can be a neural network (e.g., trained using supervised training, unsupervised training, etc.), a lookup table (e.g., associating each root cause with a specific set of recommendations), and/or be otherwise configured. The recommendation may be based on anomalous RAN data, anomalous user session data, anomalous cell data, the network conditions associated with the anomalous RAN or network usage data, and/or any appropriate data. In one example, the recommendations can be determined based on the root-cause specific KPIs, determined from the network usage data for the anomaly (e.g., for the anomalous user session, for the anomalous cell, etc.). However, the recommendations can be otherwise determined.

Returning to FIG. 1, in some embodiments, the control engine 175 optionally includes one or more machine learning models which ingest root cause specific KPIs, such as preconfigured KPIs from an operator of the mobile network or selected as default KPIs for the mobile network, use that data as training set data, and output root cause-specific optimized control actions and/or control action recommendations based on the KPIs and the effect control actions would have on those mitigating the anomalies and issues associated with those KPIs. In some embodiments, user, cell, and/or policy specific control guidance can be provided to the control engine 175. In some embodiments, notifications of control actions as well as alerts including control actions recommendations can be exposed via a GUI or API. Preferably, the control engine is fully automated, but may be additionally or alternately operated wholly or in part by an operator or operator input.

In some embodiments, the platform interface 180 optionally includes a web interface enabled by one or more computing services of the network analysis platform 100. In a preferred embodiment, the platform interface 180 enables an administrator or operator of a mobile network to interact with and make requests of the network analysis platform 100, view the results of anomaly detection and root cause classification, view severity percentages for anomalies, and/or perform other tasks. Additionally, or alternatively, the platform interface 180 may function to deploy a network analysis dashboard that may provide visualization supporting network performance metrics, root cause analysis, control action recommendations, and/or other tasks.

Figure 2:
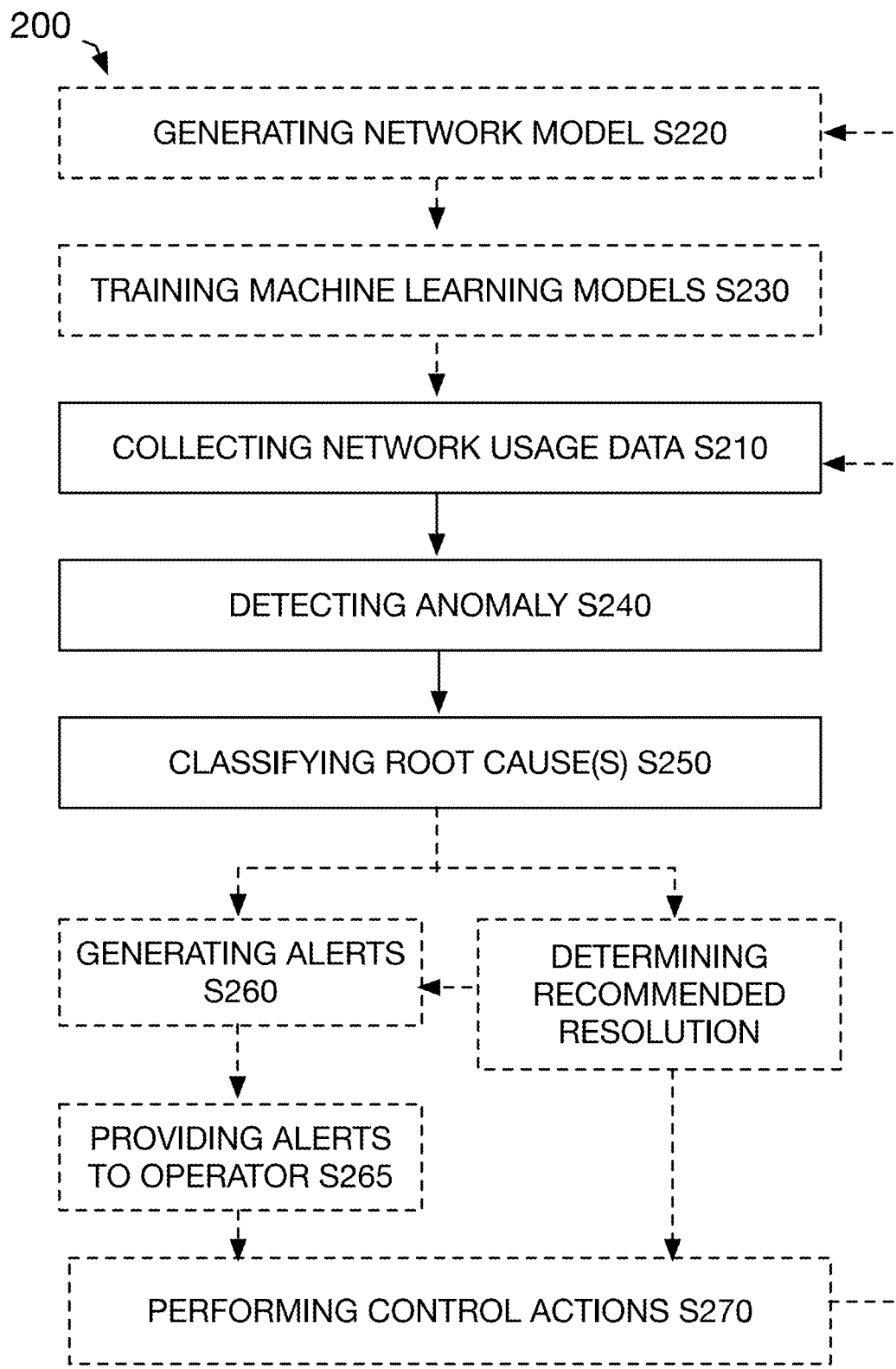
FIG. 2 illustrates a schematic representation of a method in accordance with one or more embodiments of the present application.

4. Method for Providing Intelligent Detection and Analysis of Anomalies in a Mobile Network As shown in FIG. 2, a method 200 for providing intelligent detection and analysis of anomalies in a mobile network includes collecting network usage data S210; detecting an anomaly S240; classifying root cause(s) for the anomaly S250; and optionally, generating alerts S260, providing alerts to an operator S265, and/or performing control actions S270. The method can optionally include generating a network model S220 and training machine learning models S230. The method is preferably performed by the system described above, but can additionally or alternatively be performed by any other suitable system.

In some embodiments, the method 200 is enabled by a mobile networking service, network monitoring and/or control service, network security service, internet service provider, or any other network service. In a preferred embodiment, one or more aspects of the system may be enabled by a web-based software platform (e.g., the network analysis platform) operable on a web server or distributed computing system.

S210 includes collecting network usage data of a mobile network at a network analysis platform, as described above with respect to the network model engine 130, mobile network 110, and network analysis platform 105. The method can optionally include determining user sessions from the network usage data (e.g., as described above with respect to the user session compiler, etc.).

S240 includes detecting, with the one or more machine learning models, an anomaly within an area of the mobile network, as described above with respect to the anomaly detector 150. In some embodiments, the detection includes generating a number of metrics or attributes for the anomaly, in addition to probability for the likelihood of a detected anomaly being the anomaly at issue.

S250 includes classifying, with the machine learning models or additional machine learning models, the anomaly as resulting from one or more root causes, as described above with respect to classification engine 160.

S260 optionally includes generating one or more alerts for the anomaly, as described above with respect to alert engine 170.

S265 optionally includes providing the one or more alerts to an operator or administrator of the mobile network, or device associated with an operator or administrator of the mobile network, as described above with respect to alert engine 170 and platform interface 180.

S270 optionally includes performing one or more control actions within the mobile network, as described above with respect to control engine 175.

S220 includes generating a network model based on the network usage data, as described above with respect to the network model engine 130. In some embodiments, the network model includes a plurality of features, or network usage features, identified as normal behavior or majority behavioral traits of the network.

S230 includes training one or more machine learning models using the generated network model, as described above with respect to the machine learning engine 1400.

Figure 5A:
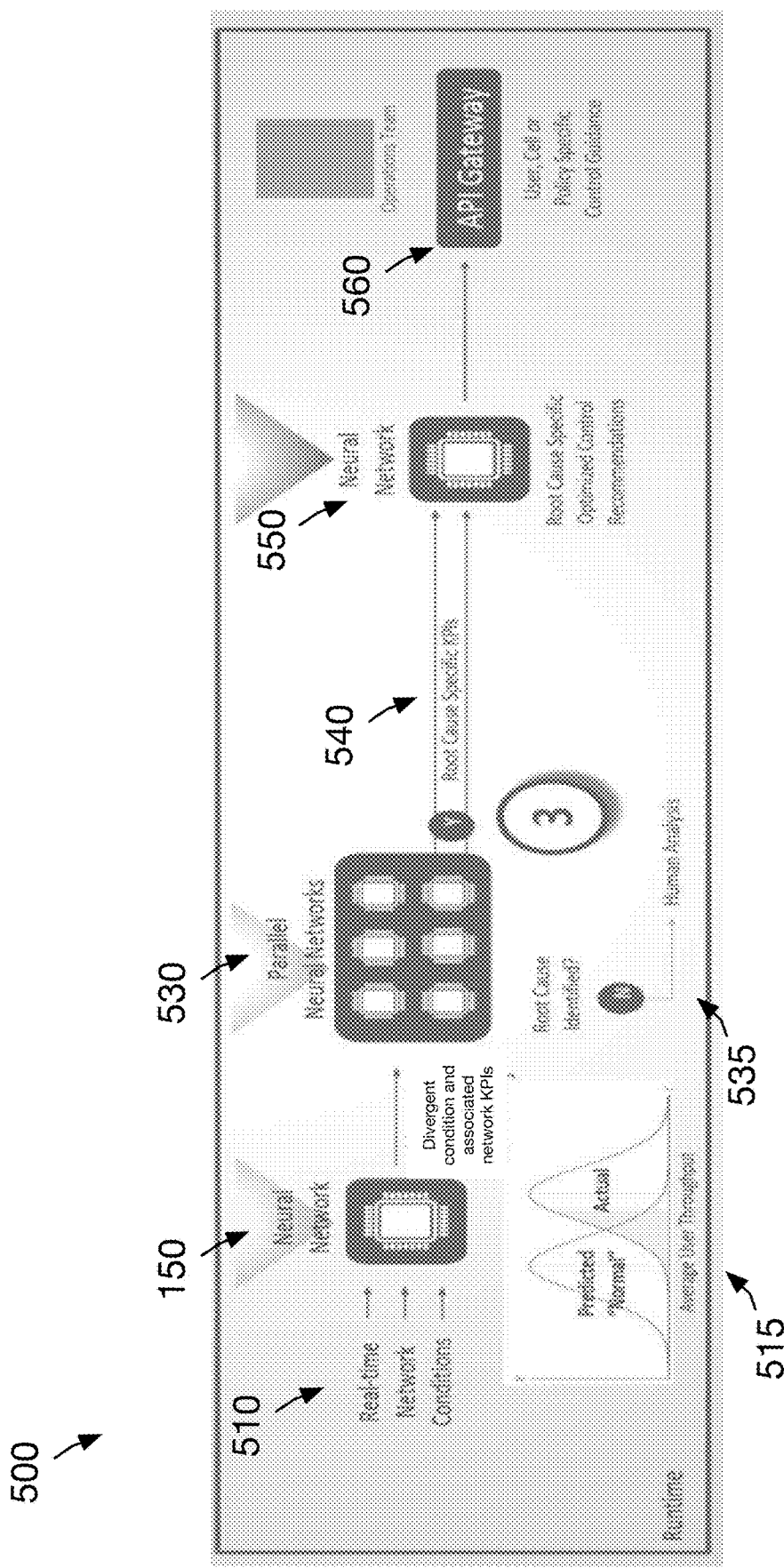
FIGS. 5A and 5B illustrate schematic representations of examples of the system in accordance with one or more embodiments of the present application.
Figure 5B:
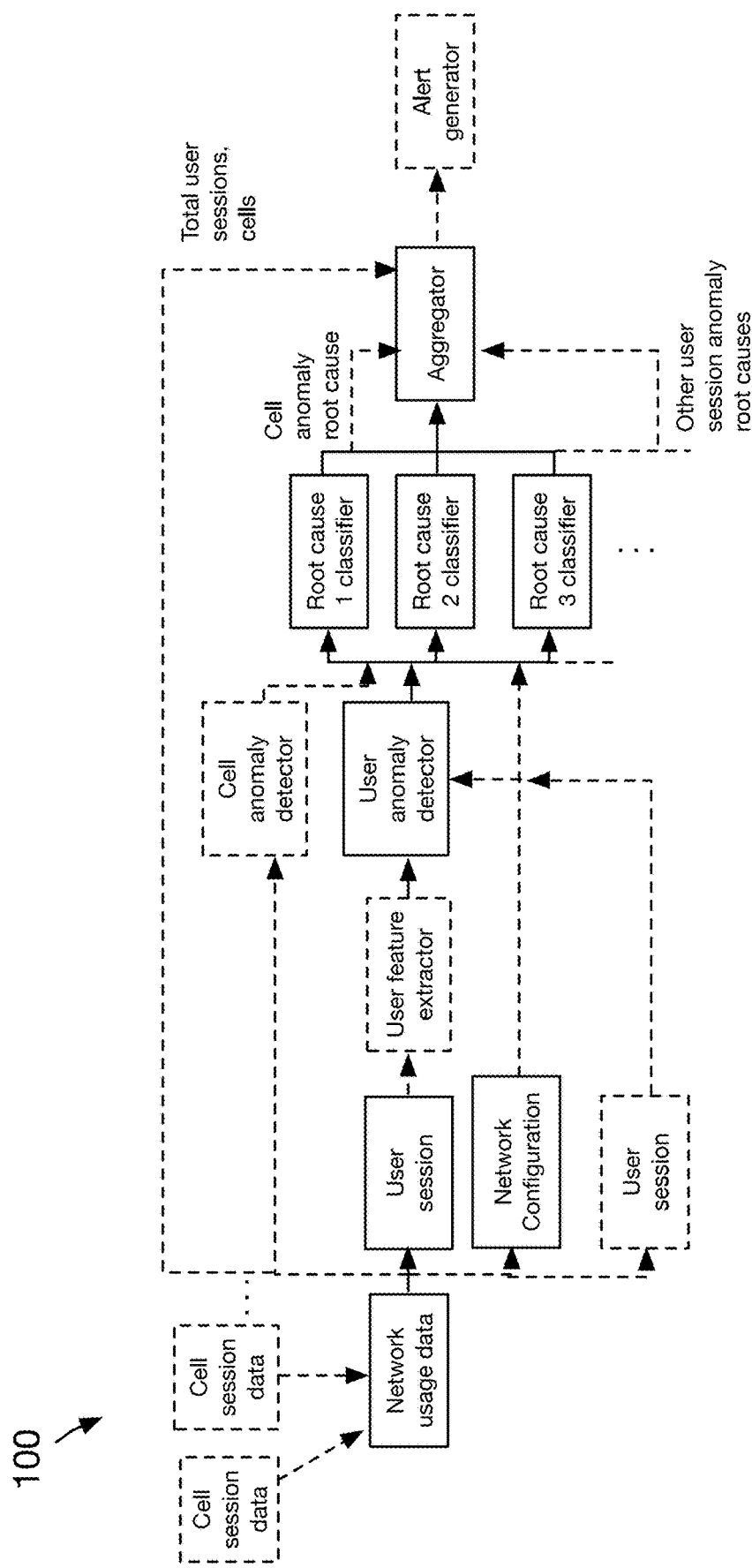

FIG. 5A illustrates a schematic representation of one example of a system 500 for training neural networks to provide analysis output in accordance with one or more embodiments of the present application. In the system, real-time network conditions 310 of a mobile network are ingested into a neural network 320 or multiple neural networks operating in parallel 330. In some embodiments, the real-time network conditions represent network usage data. In some embodiments, the network usage data is used to generate a network model which is fed into the neural network 320 or multiple neural networks 330. During run time, the mobile network is monitored and network usage data is collected in real-time, and key metrics, such as KPIs, are measured in terms of a predicted "normal" in relation to actual usage using statistical techniques. The set of "normalized" usage data is used to generate the network model which is fed into the neural network(s). This data is used as training set data to train one or more machine learning models to detect an anomaly and/or analyze an anomaly.

If a root cause is not identified for the anomaly, then human analysis 335 can be performed by an operator, administrator, or other entity of the mobile network, network analysis representative, or other entity. If a root cause is identified, then root cause specific KPIs 340 are fed into a neural network 350 which generated control recommendations based on a specific root cause for the anomaly and/or one or more preconfigured policy configurations for the mobile network. These recommendations, along with a set of alerts in a dashboard, are provided to the API gateway 360 which is exposed to the operations team of the mobile network (including operators, administrators, and/or developers of the mobile network) for querying and receiving results via an anomaly detection API. The API can be configured according to user, cell, or policy-specific control guidance to implement control actions.

Figure 6:
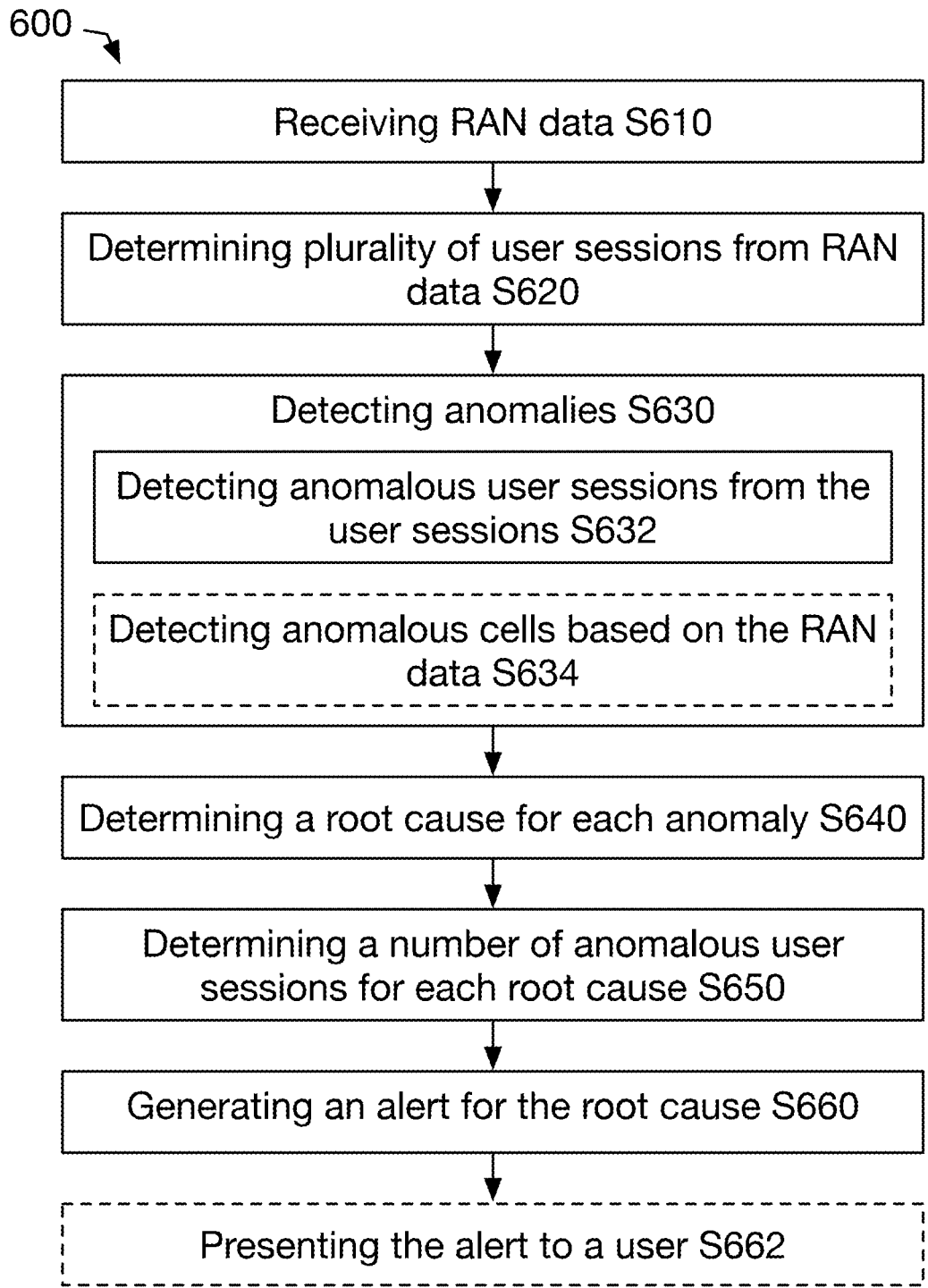
FIG. 6 illustrates a schematic representation of a method in accordance with one or more embodiments of the present application.

FIG. 6 shows an embodiment of the method 600 for providing intelligent anomaly detection and root cause analysis, which includes receiving RAN data S610, determining plurality of user sessions from RAN data S620, detecting anomalies S630 including: optionally detecting anomalous user sessions from the plurality of user sessions S632 and detecting anomalous cells based on the RAN data S634, determining a root cause for each anomaly S640, determining a number of anomalous user sessions for each root cause S650, generating an alert for the root cause S660, and optionally presenting the alert to a user S662.

Receiving RAN data S610 functions to receive RAN data generated by a set of base stations for anomaly detection. The received RAN data may be later analyzed for anomalies. RAN data can be continuous, discrete (periodic or aperiodic), timeseries, or in any other appropriate format. S610 is preferably performed by the network analysis platform, but can additionally or alternately be performed wholly or in part by any other appropriate component and/or a user input. In a first variant, S610 includes the set of base stations generating RAN data and communicating the RAN data to network analysis platform. In a second variant, S610 includes communicating with cloud, server, or database where RAN data is stored. S610 may occur with any appropriate frequency (e.g., continuously, periodically, based on a user input or other event, or any other appropriate manner).

Figure 7:
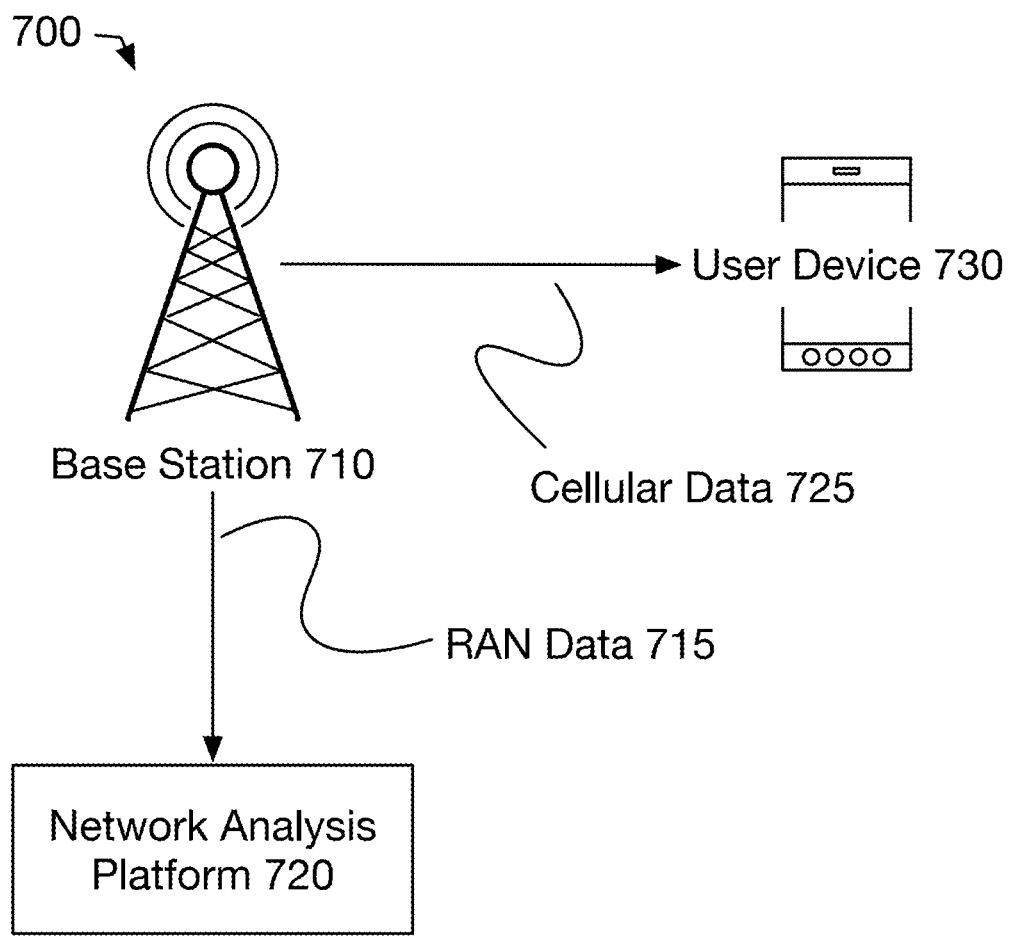
FIG. 7 illustrates a schematic representation of a system in accordance with one or more embodiments of the present application.

In a specific example (illustrated in FIG. 7), RAN data 715 is generated by a base station 710 and is received by a network analysis platform 720. The RAN data 715 is different from the cellular data 725 which is communicated to the user device 7300.

Determining plurality of user sessions from RAN data S620 functions to determine user sessions from the RAN data so that they can be analyzed for the presence of anomalies. S620 is preferably performed by the network analysis platform, but additionally or alternately may be performed wholly or in part by any other appropriate component. S620 preferably occurs after receiving RAN data and before detecting anomalies (e.g., anomalous user sessions), but can be performed at any other suitable time. S620 takes in as an input RAN data. Preferably, the user sessions are determined from the input RAN data based on a device identifier, but can additionally or alternately be determined in any appropriate manner. A device identifier can be device IMEI, but additionally or alternately can be any appropriate device identifier. Preferably, S620 occurs by identifying RAN data segments (from 1+RAN data streams) associated with the same device identifier and combining them into a user session, but can additionally or alternatively occur in any appropriate manner. S620 can occur for a given time window, continuously, periodically, or in any other appropriate manner. S620 outputs user session data, which represents a subset of the input RAN data. Preferably, user session data is a group of events/KPI/etc. associated with the device, but can additionally or alternately be any appropriate data. The user session data may be input RAN data grouped based on the device, and then further dividing into sessions based on temporal relationships (i.e. usage gaps may create multiple user sessions for a single device).

Detecting anomalous user sessions from the user sessions S632 functions to detect anomalies experienced during a particular user session which are symptomatic of a root cause in the network. S632 is performed by network analysis platform, takes in user sessions and/or user session data as an input, and outputs an anomalous user session (and/or anomalous user session data). S632 may additionally or alternately output a cell identifier, time, user session (RAN data associated with the user session), KPI symptoms, or any other appropriate data. S632 preferably occurs before determining a root cause, but may happen at any other appropriate time in the method, or appropriately in relation to any other step in the method. S632 is preferably performed by an anomalous user session detector within the network analysis platform which is different from an anomalous cell detector. Preferably, the anomalous user session detector is a single neural network, but additionally or alternatively can be any appropriate detector. Preferably, the anomalous user session is detected against a baseline, which may be a historical baseline for device/network/user session/user session's context (recurrent time, network conditions, device type, etc.), but additionally or alternately the anomalous user session may be determined in any appropriate manner. The baselines may be statistically or otherwise generated (e.g., by neural network), but may be additionally or alternately based on network configuration. The baseline may be generated for a particular device (with an associated device identifier, for a cell, or in any appropriate manner. Additionally or alternately, the baseline may be determined based on: historic data (user session, respective cell), current data (user session, respective cell), or baseline determined using a user session baseline module. Preferably, the step includes determining a set of anomaly key performance indicators (KPIs) for each user session of the plurality of user sessions; determining a baseline for each user session of the plurality of user sessions; and detecting the anomalous user session in response to the set of KPIs deviating from the baseline for the user session. In a first variation, an anomaly is detected when 1 or more KPI deviates from the baseline for the respective KPIs, given the user session parameters. In a first example, deviating KPIs are anomalous KPIs. In a second variation: the user session is classified as anomalous based on the KPIs for that session.

Detecting anomalous cells based on the RAN data S634 functions to detect cell anomalies which are symptomatic of a root cause in the network. S634 is performed by network analysis platform, takes in RAN data as an input, and outputs anomalous cells (and/or anomalous cell data). Preferably, S634 is performed by an anomalous cell detector which is different from the anomalous user session detector, but can additionally or alternately be performed wholly or in part by any other appropriate component. The anomalous cell detector is preferably a neural network, but can additionally or alternately be any other appropriate detector. S634 can additionally or alternately output cell id, duration, KPI symptoms, or have any other appropriate output. S634 preferably occurs before determining a root cause for each anomaly, but additionally or alternatively may happen at any other appropriate time in the method, or appropriately in relation to any other step in the method.

Determining a root cause for each anomaly S640 functions to determine an underlying issue/error/configuration/root cause which is resulting in the anomaly (anomalous user session and/or anomalous cell). S640 can determine one or more root causes for each anomaly (e.g., concurrently, serially, etc.). S640 is preferably performed by a set of root cause classifiers which are included in the network analysis platform. Preferably there is a single root cause classifier for each of type of root cause, but additionally or alternately there may be multiple root cause classifiers for each root cause, multiple root causes classified by each root cause classifier, and/or any appropriate number of root cause classifiers configured in any appropriate manner. S640 takes in anomalies (anomalous user sessions or anomalous cells) as an input and outputs a root cause. Additionally or alternately, S640 may output a recommendation (e.g., a recommended fix for the root cause).

Determining a number of anomalous user sessions for each root cause S650 functions to determine the impact (e.g., severity, severity score) of a particular root cause in terms of a number of affected user sessions. S650 is preferably performed by the network analysis platform, but may additionally or alternatively be performed wholly or in part by any other appropriate component. S650 may additionally or alternately operate for a group of related root causes or user/cell anomalies. S650 takes in anomalous user sessions as an input, and outputs a number. S650 may additionally or alternately output a cell id or a duration (duration which spans user session anomalies and/or network anomalies). S650 may group anomalous user sessions based on a group time (e.g., group for a period of 1 hr). The group time may be a set period/variable/based on the frequency of anomalies, but additionally or alternatively may be continuous, discrete based on user input, or any other appropriate timing. The data associated with the output may be stored linearly, circularly, or in any other appropriate manner.

Generating an alert for the root cause S660 functions to output data and/or metrics related to the root cause. S660 is preferably performed by the network analysis platform and/or any appropriate component. The alert may include: a severity score for the root cause. A severity score may be, or be determined based on: a number of users or user sessions impacted by the root cause, a percentage of users or user sessions (for a cell, region, network, etc.) impacted by the root cause, a duration of anomalous user sessions, a weight associated with the severity degree to which each session was impacted, and/or otherwise determined. The alert may further include a cell identifier and additionally or alternately a duration (spanning the detected anomalies), a set of KPI factors symptomatic of the root cause, a recommendation, and/or any other appropriate information. A recommendation may include one or more network operation parameters (e.g., localization of an illegal interferer, configuration changes for resolving a handover issue, recommended cooler cells for load balancing, adjusting power provided to the cell, adjusting electrical tilt of antennas, determining an optimal scheduler configuration for user devices, etc.). A recommendation may be automatically implemented and/or implemented by a user input (operator input).

The method can optionally include presenting the alert to a user S662, which functions to present the alert to a network operator. S662 of presenting the alert to a user is performed wholly or in part by the platform interface and/or control engine, or may be performed wholly or in part by any other appropriate component. The alert or alerts may be optionally ordered by the severity score.

5. Examples

In a first example, the method includes determining a recommendation to resolve a determined root cause. In a first variant of the first example, the recommendation is a set of network operation parameters and the method further comprises automatically controlling a base station based on the recommendation.

In a second example, the method includes generating an alert for a determined root cause, wherein the alert includes: a severity score based on the number of anomalous user sessions associated with the respective root cause. In a first variant of the second example, the alert further includes a duration of the root cause, a percentage of user sessions impacted by the root cause, a set of KPI factors symptomatic of the root cause, and a recommended fix to resolve the root cause. In a second variant of the second example, the severity score is a percentage of user sessions impacted by the root cause. In a third variant, the severity score is the number of user sessions impacted by the root cause.

In a third example, the method includes: receiving radio access network data generated by a set of base stations; determining a plurality of user sessions from the radio access network data; detecting anomalous user sessions, from the plurality of user sessions, based on the radio access network data; for each anomalous user session of the plurality of user sessions, determining one or more root causes; for each determined root cause, determining a number of anomalous user sessions associated with the root cause; and generating an alert for a determined root cause, the alert comprising a severity score determined based on the number of anomalous user sessions associated with the respective root cause.

In a fourth example, the method includes determining the plurality of user sessions by extracting a plurality of device identifiers from the radio access network data; and for each device identifier of the plurality of device identifiers:

extracting a user session, comprising data segments associated with the device identity, from the radio access network data.

In a fifth example, the method includes: receiving radio access network data generated by a set of base stations; determining a plurality of user sessions from the radio access network data; detecting anomalies, wherein the anomalies may be anomalous user sessions and/or anomalous cells, wherein detecting the anomalies includes: detecting the anomalous user sessions from the plurality of user sessions and detecting the anomalous cells based on the radio access network data; determining one or more root causes for each of the anomalies; for each determined root cause, determining: a number of anomalous user sessions associated with the root cause and cell identifiers for anomalous cells associated with the root cause; and generating an alert for a root cause from the determined root causes, the alert including the respective cell identifiers associated with the root cause and a severity score determined based on the respective number of anomalous user sessions associated with the root cause. In a first variant of the fifth example, detecting the anomaly is determining a set of anomaly key performance indicators (KPIs) from the radio access network data and detecting the anomaly based on the set of anomaly KPIs; and determining the root cause is determining a set of root cause KPIs, different from the anomaly KPIs, and determining the root cause based on the set of root cause KPIs. In a second variant of the fifth example, detecting anomalous user sessions includes: determining a set of anomaly key performance indicators (KPIs) for each user session of the plurality of user sessions; determining a baseline for each user session of the plurality of user sessions; and detecting the anomalous user session in response to the set of anomaly KPIs deviating from the baseline for the user session.

In a sixth example, the method includes determining the root cause by classifying the respective anomaly with a root cause classifier based on the radio access network data associated with the respective anomaly, wherein the anomaly is detected using an anomaly detector, wherein the root cause is determined using a plurality of root cause classifiers comprising the root cause classifier.

The method of the preferred embodiment and variations thereof can be embodied and/or implemented at least in part as a machine configured to receive a computer-readable medium storing computer-readable instructions. The instructions are preferably executed by computer-executable components preferably integrated with a system for identifying phishing websites and hindering associated activity. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
receiving radio access network data generated by a set of base stations;
determining a plurality of user sessions from the radio access network data;
detecting anomalies, the anomalies comprising anomalous user sessions and anomalous cells, wherein detecting the anomalies comprises:
    detecting the anomalous user sessions from the plurality of user sessions; and
    detecting the anomalous cells based on the radio access network data;
determining one or more root causes for each of the anomalies;
for each determined root cause, determining:
    a number of anomalous user sessions associated with the root cause; and
    cell identifiers for anomalous cells associated with the root cause; and
generating an alert for a root cause from the determined root causes, the alert comprising the respective cell identifiers associated with the root cause and a severity score determined based on a percentage of user sessions impacted by the root cause,
wherein determining the severity score comprises:
    determining the radio access network data associated with the root cause;
    determining a number of unique user sessions from the radio access network data; and
    determining the percentage of user sessions impacted by the root cause based on the number of unique user sessions and the number of anomalous user sessions associated with the root cause.

2. The method of claim 1, wherein determining the root cause comprises classifying the respective anomaly with a root cause classifier based on the radio access network data associated with the respective anomaly.

3. The method of claim 2, wherein the anomaly is detected using an anomaly detector, wherein the root cause is determined using a plurality of root cause classifiers comprising the root cause classifier.

4. The method of claim 1, wherein:
detecting the anomaly comprises determining a set of anomaly key performance indicators (KPIs) from the radio access network data and detecting the anomaly based on the set of anomaly KPIs;
determining the root cause comprises determining a set of root cause KPIs, different from the anomaly KPIs, and determining the root cause based on the set of root cause KPIs.

5. The method of claim 1, wherein detecting the anomalous user sessions comprises:
determining a set of anomaly key performance indicators (KPIs) for each user session of the plurality of user sessions;
determining a baseline for each user session of the plurality of user sessions; and
detecting the anomalous user session in response to the set of anomaly KPIs deviating from the baseline for the user session.

6. The method of claim 1, further comprising:
determining a recommended set of network operation parameters to resolve the root cause; and
automatically controlling the set of base stations based on the recommended set of network operation parameters.

7. The method of claim 1, wherein the alert indicates the number of anomalous user sessions associated with the root cause.

8. The method of claim 1, wherein:
- the anomalous cells are detected by a cell anomaly detector; and
- the anomalous user sessions are detected by a user session anomaly detector, different from the cell anomaly detector.

9. A method comprising:
- receiving radio access network data generated by a set of base stations;
- determining a plurality of user sessions from the radio access network data;
- detecting anomalous user sessions, from the plurality of user sessions, based on the radio access network data;
- for each anomalous user session of the plurality of user sessions, determining one or more root causes;
- for each determined root cause, determining a number of anomalous user sessions associated with the root cause; and
- generating an alert, for a determined root cause, based on a severity score,
- wherein determining the severity score comprises:
  - determining the radio access network data associated with the root cause;
  - determining a number of unique user sessions from the radio access network data; and
  - determining whether a percentage of user sessions impacted by the root cause based on the number of unique user sessions and the number of anomalous user sessions associated with the respective root cause.

10. The method of claim 9, wherein determining the root cause comprises classifying the respective anomaly with one or more root cause classifiers based on the radio access network data associated with the respective anomaly, wherein the anomaly is detected using an anomaly detector, wherein the root cause is determined using a plurality of root cause classifiers comprising the root cause classifier.

11. The method of claim 9, further comprising presenting the alert to a user; wherein the alert is ordered, within a list of alerts, based on the severity score.

12. The method of claim 9, wherein the alert comprises a severity score, determined based on the radio access network data associated with the respective root cause.

13. The method of claim 9, further comprising determining a recommendation to resolve a determined root cause.

14. The method of claim 13, wherein the recommendation comprises a set of network operation parameters.

15. The method of claim 14, further comprising automatically controlling the set of base stations based on the set of network operation parameters.

16. The method of claim 9, wherein the alert further comprises:
- a duration of the root cause,
- a percentage of user sessions impacted by the root cause, and
- a set of KPI factors symptomatic of the root cause.

17. The method of claim 9, wherein determining the plurality of user sessions comprises:
- extracting a plurality of device identifiers from the radio access network data; and
- for each device identifier of the plurality of device identifiers: extracting a user session, comprising data segments associated with the device identity, from the radio access network data.

18. The method of claim 9, further comprising generating radio access network data with the set of base stations.

19. The method of claim 9, wherein the alert indicates the number of anomalous user sessions associated with the root cause.

* * * * *